United States Patent [19]

Takasu et al.

[11] Patent Number: 4,785,675

[45] Date of Patent: Nov. 22, 1988

[54] METHOD OF AND DEVICE FOR DETECTING TORQUE

[75] Inventors: Shuuhei Takasu; Takao Terabayashi; Isao Takahashi, all of Yokohama; Yoichi Daiko, Hadano, all of Japan

[73] Assignee: Hitachi, Ltd., Tokyo, Japan

[21] Appl. No.: 40,124

[22] Filed: Apr. 20, 1987

[30] Foreign Application Priority Data

Apr. 21, 1986 [JP] Japan .................................. 61-89913

[51] Int. Cl.⁴ .............................................. G01L 3/14
[52] U.S. Cl. .................................................. 73/862.33
[58] Field of Search ........... 73/862.08, 862.33, 862.35, 73/862.36

[56] References Cited

U.S. PATENT DOCUMENTS 3,823,608  7/1974  Pantermuehl et al. .......... 73/862.33
4,135,390  1/1979  Templin ........................... 73/862.34

*Primary Examiner*—Charles A. Ruehl
*Attorney, Agent, or Firm*—Antonelli, Terry & Wands

[57] ABSTRACT

The present invention relates to a method of and a device for detecting torque, and more particularly to a method of and a device for detecting torque which are suitable for use at the time of a high-velocity rotation or for detecting a very small torque. An annular or ring-like elastic member is interposed between, for instance, a drive shaft and a load shaft constituting a torque-transmitting shaft system, and is formed with slits with parts of an outer periphery thereof left unslitted to be divided in the axial direction so that the member is of a configuration easily deformable in the radial direction thereof by means of torque. A non-contact type displacement sensor is provided for measuring the deformation of the elastic member, and a marker is attached on the drive shaft to provide a positional signal for use as a sampling signal. The signal of the displacement sensor is extracted on the basis of the sampling signal to be stored and held. At the time when that value of that deformation signal has exceeded a threshold, an overload signal is output, and further the torque load is released responsively to that output signal.

7 Claims, 6 Drawing Sheets

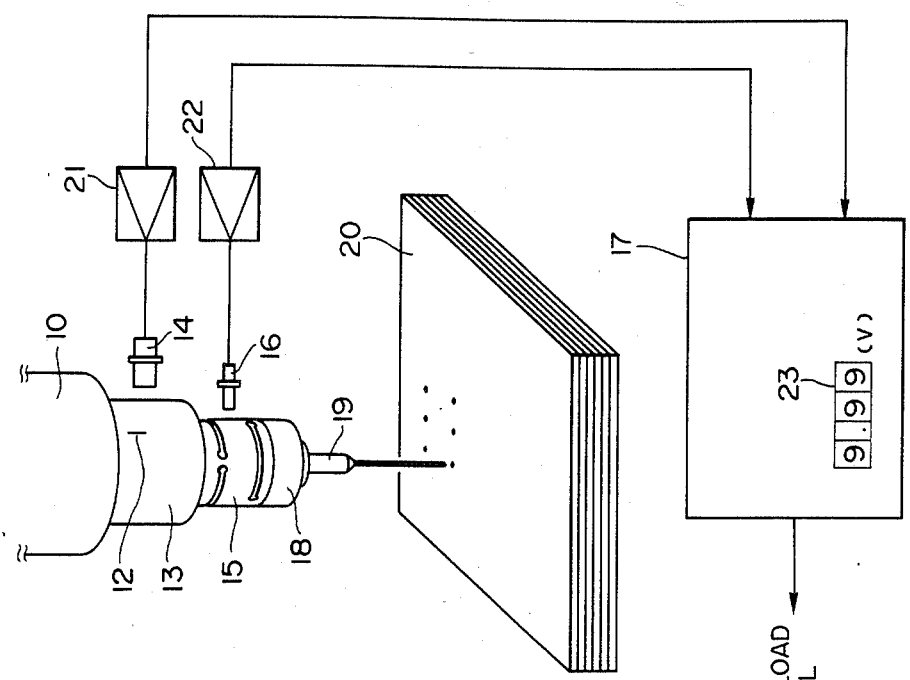
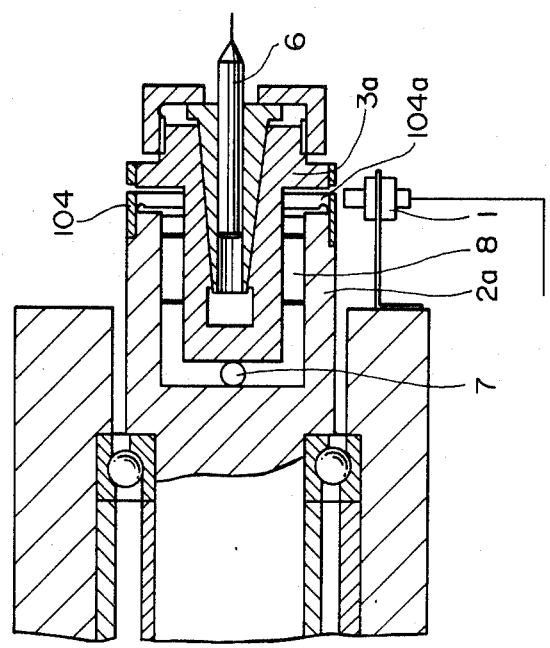

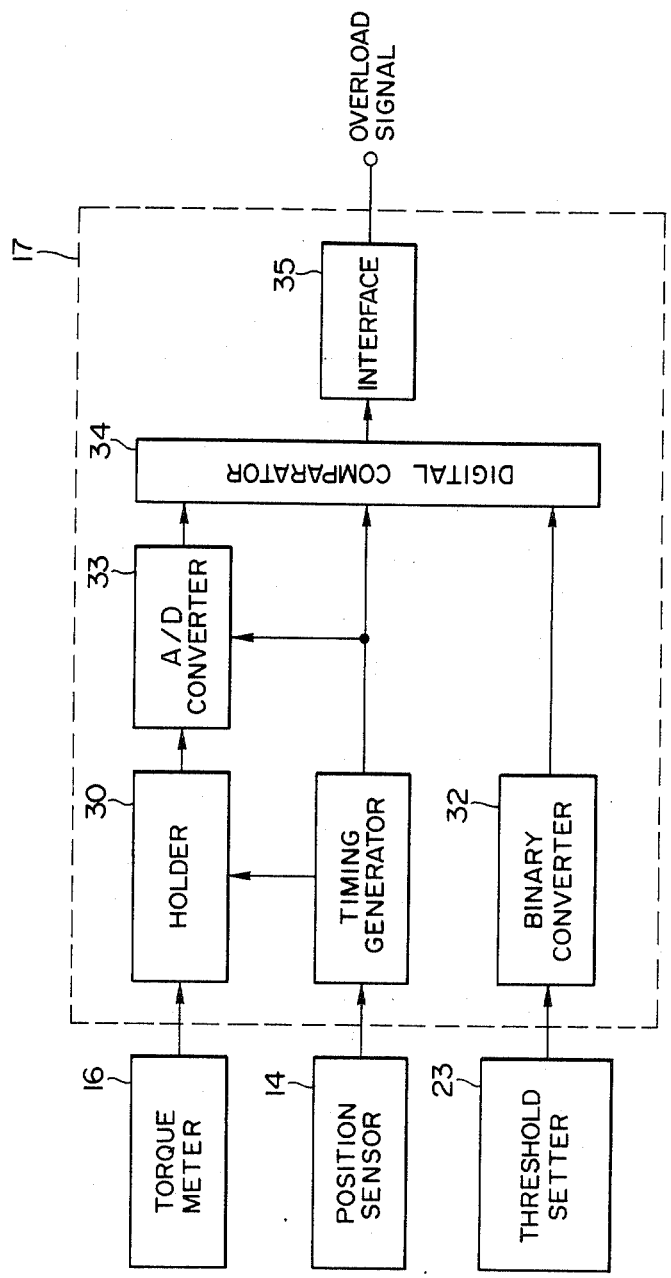

TORQUE SIGNAL

POSITION SENSOR SIGNAL

SAMPLING / HOLDING WAVEFORM 1

SAMPLING / HOLDING WAVEFORM 2

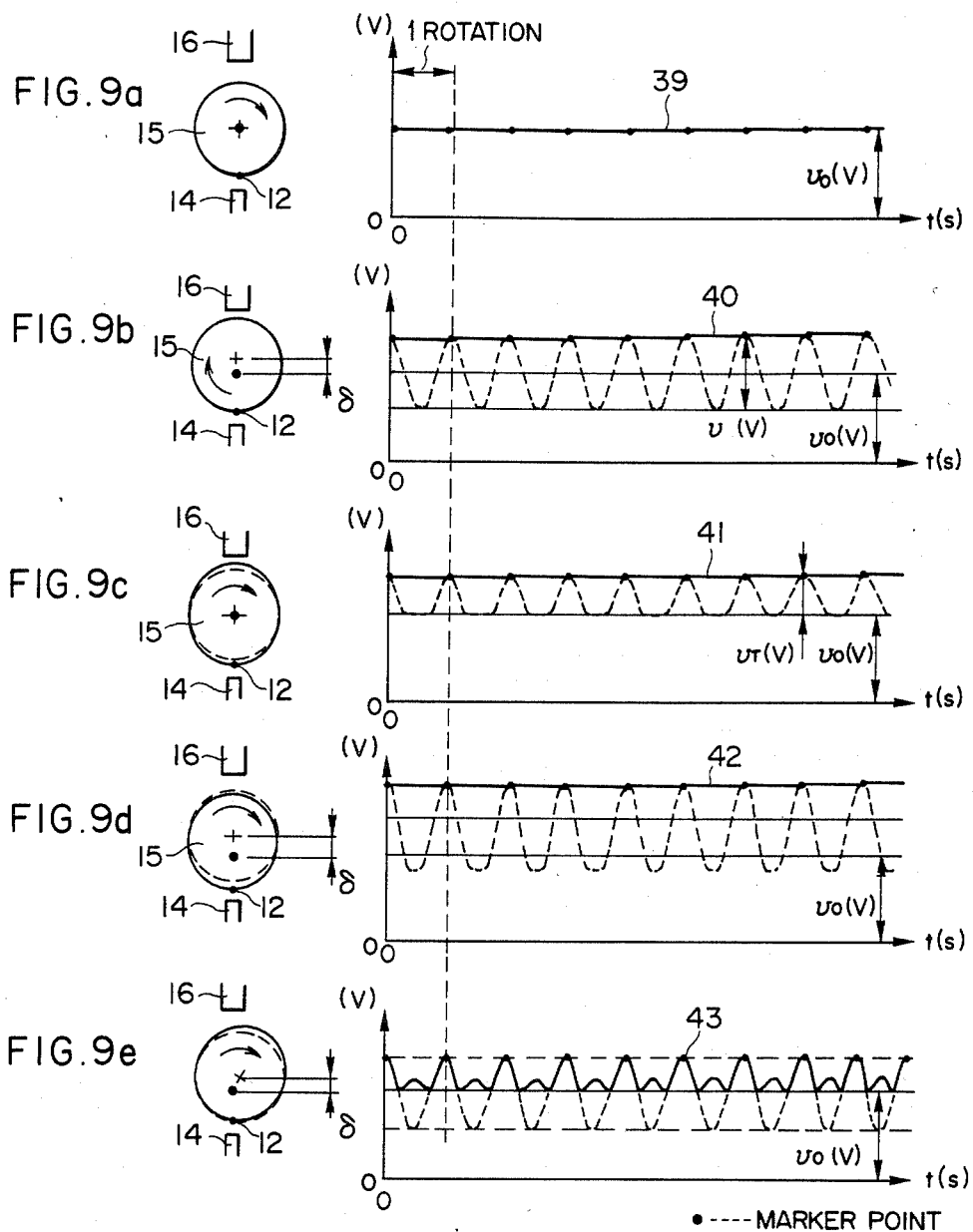

METHOD OF AND DEVICE FOR DETECTING TORQUE

BACKGROUND OF THE INVENTION

The present invention relates to a method of and a device for detecting torque, and more particularly to a method of and a device for detecting torque which are suitable for detecting torque under the condition of high-revolution speed or for detecting a very small torque.

A conventional method of and a device for detecting the torque of a torque-transmitting system is generally arranged such that an elastic member with a strain gauge attached thereto is inserted into the torque-transmitting shaft system, and a signal is put out via a slip ring as disclosed in, for instance, Japanese Patent Unexamined Publication No. 1940/1982. However, with such a method of and a device for detecting torque by using the slip ring, since a contacting point exists, noises become large owing to the occurrence of heat, etc. at the contacting point during high-velocity rotation, with the result that it is difficult to effect an accurate measurement.

As another kind of method of detecting torque in a non-contact state, a method of measuring a decline in the number of revolutions of the main shaft in a torque-transmitting shaft system due to the torque exerted thereto is discussed on pages 723 through 726 of a collection of treatises presented at a science lecture meeting for the 1984 autumn session of the Japan Society of Precision Engineering. This method is, however, applicable only to a low-rotation speed ranging between several thousand to 20,000 r.p.m. This is caused by the fact that a time lag from the time when a torque is applied to the main shaft until the time when the number of revolution of the main shaft is actually reduced is large, so that there is a problem in this method that the response characteristics is unsatisfactory.

SUMMARY OF THE INVENTION

An object of the present invention is to provide a method of and a device for detecting torque, which make it possible to measure the torque with excellent response characteristics even at high-revolution speed.

To this end, according to the present invention, an annular or ring-like elastic member is interposed between, for instance, a drive shaft and a driven or load shaft constituting a torque-transmitting shaft system. The ring-like member is formed with slits, leaving at least a portion of an outer periphery thereof unslitted, to be divided in the axial direction, so that the member has a configuration which is easily deformable in the radial direction when applied with a torque. A non-contact type displacement meter is provided for measuring the deformation of this elastic member and a marker is attached on the drive shaft to provide a positional signal for use as a sampling signal. The signal of the displacement meter is extracted on the basis of the sampling signal to be stored and held. At the time when the value of that deformation signal has exceeded a threshold, an overload signal is output, and further the torque load is responsively released according to that output signal.

BRIEF DESCRIPTION OF THE DRAWINGS

FIG. 5 is a vertical sectional side view showing a torque detecting device in accordance with still another embodiment of the present invention;

FIG. 6 is an overall schematic view showing a torque detecting system in accordance with an embodiment of the present invention;

FIG. 7 is a schematic diagram illustrating the detailed arrangement of a control unit of the system shown in FIG. 6;

FIGS. 9a to 9e are diagrams illustrating the waveforms of signals which represent the deformation of the elastic ring according to the invention under various conditions and are extracted on the basis of positional signals, respectively.

DESCRIPTION OF THE EMBODIMENTS

Figure 1:
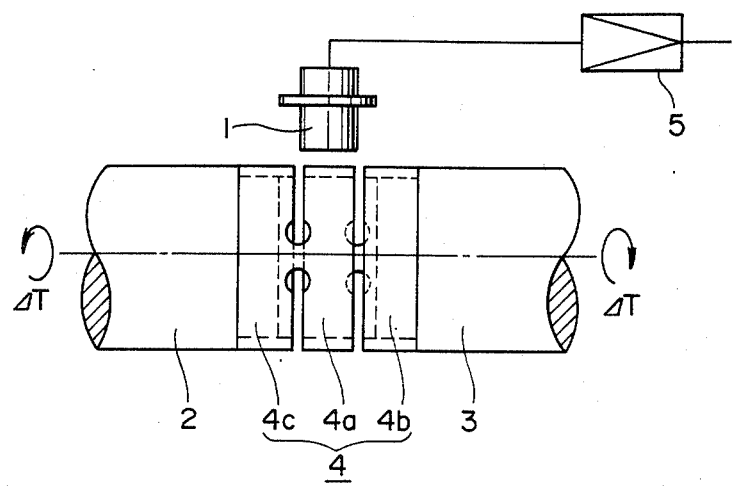
FIG. 1 is a front view showing a torque detecting device in accordance with an embodiment of the present invention.

First, description will be made of the basic arrangement of a torque detecting device in accordance with the present invention. FIG. 1 illustrates the torque detecting device in accordance with one embodiment of the present invention. As shown in this drawing, the torque detecting device comprises an elastic member which is disposed at a predetermined position of a torque-transmitting system and which is subjected to deformation in response to the magnitude of a torque applied to the system, and a non-contact displacement sensor 1 which is disposed in face-to-face relationship to the elastic member with a predetermined gap therebetween for detecting the amount of deformation of the elastic member. This arrangement makes it possible to obtain the torque detecting device which can perform the measurement of torque without a time lag and with good response characteristics even during high-velocity rotation. Additionally, since the amount of deformation of the elastic member during rotation is detected by the non-contact displacement sensor 1 to measure torque, it becomes possible to provide the method of measuring torque, which method enables the measurement of torque to be effected with good response characteristics even during high-velocity rotation.

More specifically, the elastic member is disposed between a drive shaft 2 and a driven or load shaft 3 of the torque-transmitting system. This elastic member is constituted by an elastic ring 4 having an elastic deformation portion 4a and fixing portions 4b, 4c. The fixing portions 4b, 4c are connected to the elastic deformation portion 4a at positions which are circumferentially offset with respect to each other by 180 degrees. The fixing portion 4b is secured to the load shaft 3 and the fixing portion 4c is secured to the drive shaft 2. The non-contact displacement sensor 1 is constituted by an eddy-current type, a capacitance type or a optical type sensor. Incidentally, reference numeral 5 in the drawing denotes an amplifier which is connected to the non-contact displacement sensor 1.

Figure 2:
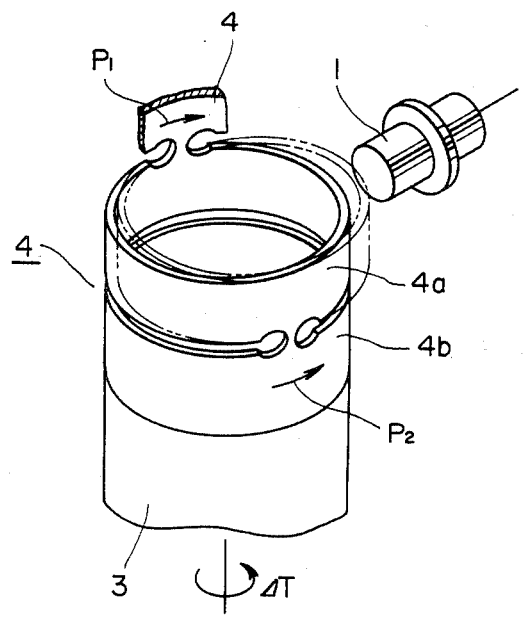
FIG. 2 is a perspective view for illustrating the function of an elastic deformation portion of the torque detecting device shown in FIG. 1.

In this arrangement, as shown in FIG. 2, when torque $\Delta T$ is applied to the load shaft 3, forces $P_1$, $P_2$ are produced in the directions shown by the arrows in the drawing in the connecting portions between the fixing portions 4b, 4c and the elastic deformation portion 4a of the elastic ring 4, respectively. As a result, the elastic deformation portion 4a is deformed radially as shown by one-dot chain lines in the drawing. Since the amount of this deformation is proportional to the torque, it can be determined by measuring that amount of deformation with the non-contact displacement sensor 1. Thus, according to this embodiment, there is no need to provide a contacting portion or an FM modulator or the like for allowing a strain signal to be carried by carrier waves, and the torque can be detected without any contact, so that it is possible to provide the method of and the device for measuring torque which may effect the measurement of a very small torque with excellent response characteristics even under the condition of high-revolution speed.

Figure 3:
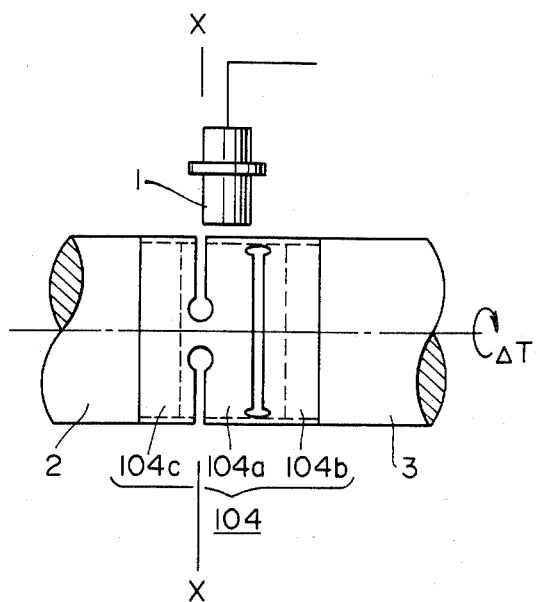
FIG. 3 is a front view showing a torque detecting device in accordance with another embodiment of the present invention.

FIG. 3 shows another embodiment of the present invention. In the subsequent description, elements or portions that are similar to those of the above-described embodiment are denoted by the same reference numerals as used thereto, and detailed description of these elements or portions will be omitted.

Figure 4:
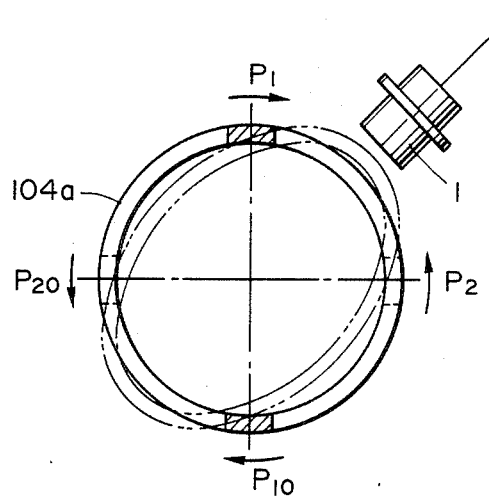
FIG. 4 is a cross-sectional view for illustrating the function of an elastic deformation portion of the torque detecting device taken along the line X—X of FIG. 3.

In this embodiment, an elastic deformation portion 104a of an elastic ring 104 is connected to a fixing portion 104b through two portions which are opposed to each other with the axial center of the ring therebetween, while the elastic deformation portion 104a and a fixing portion 104c are connected to each other through two portions which are offset by 90 degrees from the connecting portions between the elastic deformation portion 104a and the fixing portion 104b, respectively, and which are opposed to each other with the axial center of the ring therebetween. According to this arrangement, as shown in FIG. 4, when the torque $\Delta T$ acts on the load shaft 3, forces $P_1$, $P_{10}$, $P_2$, and $P_{20}$ are produced in the respective connecting portions of the elastic deformation portions 104a to act in the directions shown by the arrows in the drawing, respectively. Thus, the elastic deformation portion 104a is deformed symmetrically with respect to the axial center of the ring, as shown by the one-dot and chain lines in the drawing. Accordingly, this arrangement achieves a result that the occurrence of unbalanced forces owing to high-revolution speed may be suppressed as compared with the aforementioned arrangement.

FIG. 5 shows still another embodiment of the present invention. This embodiment shows a case where the present invention is applied to a drilling machine in which bending force, axial force, and torque act as cutting resistance. In this embodiment, an elastic member is constituted by the elastic ring 104 which is deformable axially and interposed between a main shaft 2a and a collet chuck 3a for holding a drill 6, the collet chuck 3a being coupled to the main shaft 2a via a ball 7 and a roller bearing 8. More specifically, the collet chuck 3a for fixing the drill 6 is coupled with the main shaft 2a via the ball 7 which is placed therebetween on their central axis, via the roller bearing 8 which is placed between the inner periphery of the main shaft 2a and the outer periphery of the collet chuck 3a, and via the elastic ring 104 which is placed around their outer peripheries. The non-contact displacement sensor 1 is disposed adjacent and perpendicular to the outer peripheral surface of the elastic deformation portion 104a of this elastic ring 104 with a predetermined gap therebetween. By virtue of this arrangement, the axial force applied to the drill 6 is received by the ball 7, and the bending force is received by the roller bearing 8, so that only the torque may act on the elastic ring 104. Thus, even when the torque, bending force, and axial force act simultaneously, it is possible to measure the torque with excellent accuracy.

As has been described, with the torque detecting device in accordance with the present invention, when torque is applied to the input side of the torque-transmitting system, opposite circumferential forces respectively act on the connecting portions of the central cylindrical member (elastic deformation portion) of the elastic ring, which elastic ring is divided axially into three portions, or the central cylindrical member and the rings (fixing portions) disposed on the both sides thereof and connected thereto respectively. Consequently, the cylindrical member between the connecting portions can be regarded as a bent beam, and is subjected to an elastic deformation in the radial direction thereof. By detecting the amount of this elastic deformation with the non-contact displacement sensor, the torque can be measured with quick response even at high revolution speed.

Hereinafter, description will be made of a specific embodiment of a torque detecting and controlling system which employs the torque detecting device in accordance with the present invention.

FIG. 6 is a schematic perspective view of the embodiment of the torque detecting system in accordance with the present invention.

In FIG. 6, a mechanism is shown wherein a torque-transmitting shaft system is rotated at a high speed ranging from 50,000 to 100,000 r.p.m. while being gradually lowered vertically so as to perforate a printed circuit board 20 by a drill 19 fixed to the shaft system. A driven or load shaft 18 of the system has the function of receiving and chucking the drill 19 and is transmitted with the rotational force of a drive shaft 13 via an elastic ring 15. The elastic ring 15 has the function of converting the torsion applied thereto due to the torque on the drill 19 into the radial deformation of the elastic ring. The drive shaft 13 performs the function of transmitting the rotational force of a motor 10. As the torque of the motor 10 is sufficiently greater than that counteractively applied to the drill 19 by the printed circuit board, there are no fluctuation in the rotation of the drill 19, so that the rotation of the drill 19 is maintained at a constant speed. A marker 12 is a mark which is attached at a predetermined point on the drive shaft 13, and is used for obtaining a sampling signal for determining the timing of extracting a torque signal. A position sensor 14 reads the marker 12 by, for example, an optical or magnetic means and converts the reading into an electric signal to output the same. A torque meter 16 is a displacement sensor in which changes in the gap between the elastic ring 15 and the torque meter 16, caused by a radial deformation of the elastic ring 15, are detected and converted into an electric signal according to a certain relationship between the gap and electric voltage, e.g., 1 $\mu$m/10 mV. Amplifiers 21, 22 respectively amplify the very weak signals of the position sensor 14 and the torque meter 16. A controller 17 receives and processes the thus amplified signals of the torque meter 16 and the position sensor 14.

The operation of this detection system will be described hereinunder.

In FIG. 6, the marker 12 attached on the drive shaft 13 of the torque-transmitting system is, for instance, an optical reflection tape or a groove formed in the shaft. In the former case, the position sensor 14 for detecting the presence of this marker 12 is the combination of light projecting and receiving elements which are disposed in the vicinity of the outer periphery of the drive shaft 13 in a certain angular relation to and with a distance from the reflecting surface of the tape. In the latter case, the position sensor 14 is a displacement meter for detecting a change in the gap owing to the groove in the shaft. With this arrangement, a signal having periodic pulses proportional to the number of revolution of the drive shaft 13 is obtained without contact of the sensor to the marker, which pulse signal is used as a sampling signal for a torque signal that will be described below.

To measure the amount of deformation of the elastic ring 15 at the time when torque is applied thereto, the torque meter 16, which is disposed in the vicinity of the outer peripheral surface of the central portion of the elastic ring perpendicularly thereto, outputs an electric signal in proportion to an increase or decrease in the gap between the elastic ring 15 and the torque meter 16, which increase or decrease is caused by the deformation of the plastic ring 15. The torque-detecting system comprising the position sensor 14 and the torque meter 16 makes it possible to extract a torque signal accurately. The extracted torque signal is sent to the controller 17 and processed therein as follows. As shown in FIG. 7, the signal from the torque meter 16 which represents the detected amount of deformation of the elastic member is transmitted to a holder 30 of the controller in the range of 0 to 10 V.

Meanwhile, the periodic pulse signal from the position sensor 14 is supplied through a timing generator to the holder 30 as a sampling/holding signal, and serves as a trigger signal for converting the signal of the torque meter into that representing a change in the deformation of a particular point of the elastic ring 15 with the passage of time so as to extract a relative change in the torque. A torque signal output by the holder 30 is sent to an A/D converter 33 to be converted into a digital amount. The output signal of the A/D converter 33 is supplied to a digital comparator 34. At the same time, a threshold signal is sent from a threshold setter 23 to a binary converter 32, in which signal a threshold $A_o$ has been set to a desired level within the range of 0.00–9.99 V by means of a digital switch or the like. The threshold $A_o$ is converted to a binary digital value in the binary converter 32. The output signal of the converter 32 is also supplied to the digital comparator 34 so as to compare and determine the relative size of the two data. When the data of the A/D converter 33 is equal to or greater than the data of the threshold $A_o$, determination is made that a drill overload has occurred, and an output is made to an interface 35. The interface 35 converts the output of a digital signal level voltage from the converter 33 into the signal of a sufficient voltage level and transmits the same for controlling the drive unit of the torque-transmitting system. The overload signal from the interface 35 is sent to the driver unit of the rotational shaft system, and is used as a signal for lifting the drill vertically at a high speed to obviate a drill breakage.

In sum, the holder 30 samples the signal of the torque meter 16, which is changing every moment in response to the varying load of the torque, on the basis of the pulse signal of the position sensor 14, stores and holds the thus sampled signal. Accordingly, in the output of the holder 30, the signal of the torque meter 16 for detecting the deformation of the entire periphery of the elastic ring 15 has been converted into the signal representing the change of deformation with the passage of time at the fixed point of the elastic ring, which point corresponds to the pulse-generating position of the position sensor 14. It is possible, therefore, to measure the torque signal accurately regardless of the presence of an A.C. drift voltage which is mixing in the output of the torque meter due to the mechanical eccentricity of the elastic ring or the load shaft.

Referring next to FIGS. 8a to 8d, description will be made of the basic principle of the operation of the holder 30.

Figure 8A:
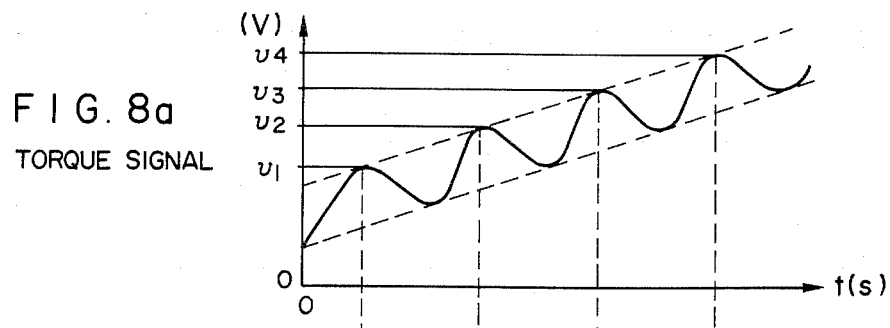
FIGS. 8a to 8d are explanatory diagrams for illustrating the process of extracting torque signals according to the invention.
Figure 8B:
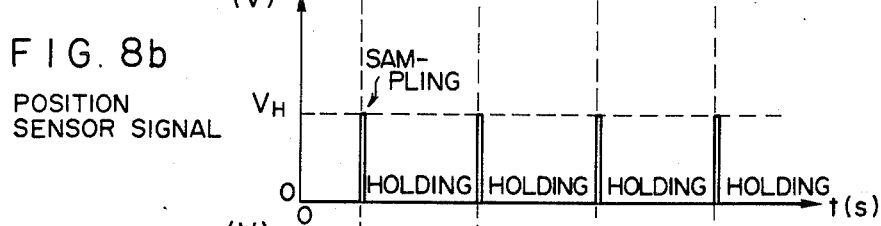
Figure 8C:
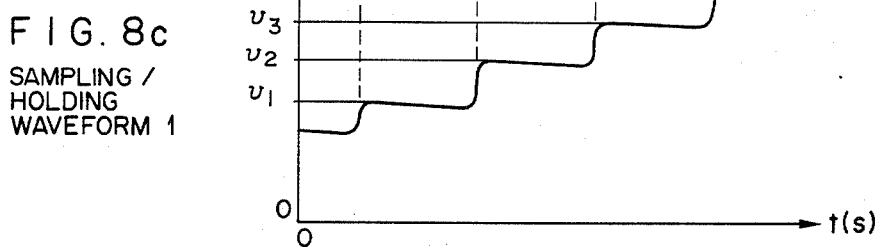
Figure 8D:
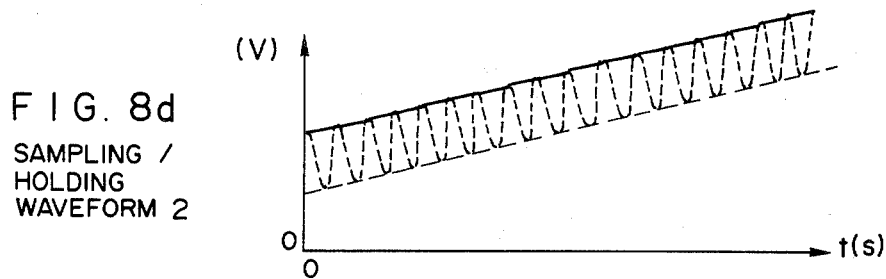

Assuming here that the torque signal is of an A.C. wave-form in which the absolute value thereof becomes gradually large as shown in FIG. 8a, when the sampling/holding signal of the position sensor in the form of such periodic pulses as shown in FIG. 8b is applied to the torque signal of FIG. 8a, a signal of such a waveform as shown in FIG. 8c is output to the holder 30. For facilitating the description, the signal of the position sensor in FIG. 8b is assumed to have a longer cycle than the signal frequency of the torque signal in FIG. 8a. In this embodiment, however, as the torque signal is actually sampled and held at every cycle which is several times the frequency band of the torque signal, i.e., several times the maximum frequency of the torque signal, a wave-form increasing in a monotonous manner as shown in FIG. 8d is obtained. Consequently, FIG. 8d represents the change in the torque with the passage of time at the one point of the elastic ring.

FIGS. 9a to 9e show various signals of the holder 30 which are obtained by sampling the signal of the torque meter 16 with the pulses of the position sensor 14 using the marker.

FIG. 9a shows a case where there is no eccentricity in the elastic ring 15 or the load shaft 18, in which a waveform 39 is the output of the holder 30 in a no-load state. Specifically, this waveform means that a fixed interval between the elastic ring 15 and the torque meter 16 is detected, and $v_o$ [V] is held. The thus held signal decreases by degrees at a certain rate until the next sample pulse (a pulse from the position sensor) is received. In the cases of FIGS. 9b to 9d as well, signals show the same tendency of the gradual decrease.

FIG. 9b shows a case where the elastic ring 15 is eccentric by an amount of $\delta$ from the center of rotation, in which a waveform 40 is the output by the holder 30 in a no-load state. Specifically, in this case, an electric signal which represents the deformation corresponding to the amount of eccentricity $\delta$ of the elastic ring 15 varies in such a manner as a sine curve with a voltage of v [V] as a peak-to-peak value and with the voltage of $v_o$ [V] as the center, and the thus varying signal is sampled and held at its peaks so that the sampled signal is constant at v [V] and undergoes no change.

FIG. 9c shows a case where the elastic ring 15 has no eccentricity and a fixed torque is applied thereto, in which a waveform 41 is the output by the holder 30. As described above, the point of maximum projection or deformation of the elastic ring 15 is located at a fixed portion, and a signal which is obtained by sampling and holding the point with the pulse of the position sensor changes at a fixed value of $v_T$ [V].

FIG. 9d shows a case where the elastic ring 15 is eccentric by an amount of 6 from the center of rotation and a fixed torque is applied thereto, in which a waveform 42 is the output by the holder 30.

FIG. 9e shows a waveform which is generated under the same condition as that of FIG. 9d except that the positions of the peaks of the eccentric waveform 40 and the pure torque signal 41 are offset with each other.

From FIGS. 9d and 9e, it can be concluded that when a drift voltage caused by the eccentricity of the elastic ring is used as a reference to set a threshold having a voltage over the reference, it is possible to measure a torque signal.

Here, reference will be made to the problem of the signal processing speed in the embodiment. The time required in processing a series of sequences for monitoring the torque signal and for outputting an overload signal to the drive unit of the torque-transmitting system when the level of the torque signal is equivalent to or greater than the threshold $A_o$ is preferably as fast as possible. However, it is necessary to complete this processing prior to the sampling of an subsequent torque signal by the position sensor. This processing time depends on the number of revolution of the drive shaft. In this embodiment, the processing time is several hundred to several kHz in terms of the signal frequency of the position sensor, and nought point several millimeters per second or above in terms of the cycle. An electronic circuit for processing the torque signal with a satisfactory accuracy may be made without any difficulty when elements to be used in the circuit are selected by using this processing time as a target.

As described above, in accordance with the present invention, it is possible to effect the detection of torque with a high resolution even in regard to a very small torque and with excellent response characteristics even at a high-revolution speed.

What is claimed is:

1. A device for detecting torque of a torque-transmitting shaft system, comprising:
    a main shaft and a collet chuck for holding a drill of a drilling machine;
    an elastic ring which is deformable in a radial direction in response to said torque interposed between said main shaft and said collet chuck coupled thereto via a ball and a roller bearing; and
    a non-contact displacement sensor disposed in face-to-face relationship to said elastic ring with a predetermined gap therebetween for detecting an amount of deformation of said elastic ring.

2. A device for detecting torque, comprising:
    an elastic member provided on a rotary shaft system and deformable in a radial direction thereof in response to magnitude of the torque;
    a sensor for converting an amount of deformation of said elastic member into an electric signal in a non-contact state; and
    a sensor for detecting a reference pulse which provides a timing to determine a change in the amount of deformation with passage of time at a given point of said elastic member.

3. A device as claimed in claim 2, further comprising means for detecting occurrence of an excessive torque in a drill fixed to an end of said rotary shaft system at a time when level of an electric signal corresponding to the amount of deformation of said elastic member has reached a predetermined threshold as torque is applied thereto.

4. A method of detecting torque exerted on a torque-transmitting shaft system, comprising the steps of:
    providing a cylindrically shaped elastic member in said torque-transmitting shaft system at a predetermined position thereof, said elastic member being elastically deformable in a radial direction in response to the torque;
    rotating said torque-transmitting shaft system; and
    detecting an amount of radial deformation of said cylindrical elastic member by means of a non-contact displacement sensor disposed in face-to-face relationship with said elastic member.

5. A method according to claim 4, wherein said cylindrically shaped member includes three ring-like portions that are joined to be at adjacent axial positions along a shaft, said ring-like portions being defined by circumferential slits which are respectively formed in an outer periphery of said cylindrical member at two axially spaced positions thereof to extend in opposite directions with unslitted parts of the outer periphery joining adjacent portions.

6. A method according to claim 4, wherein said cylindrical elastic member is of a shape having two pairs of circumferential slits respectively formed in an outer periphery of said cylindrical member at two axially spaced positions with first and second pairs of diametrically opposite parts of the outer periphery joined by unslitted portions, said first pair of the outer peripheral parts being offset angularly by 90 degrees from said second pair of the outer peripheral parts.

7. A method of detecting torque exerted on a torque-transmitting shaft system composed of a main shaft and a collet chuck coupled thereto via a bearing for holding a drill of a drilling machine, said cylindrical elastic member being elastically deformable in a radial direction in response to torque and being interposed between said main shaft and said collet chuck, said method comprising the steps of:
    rotating said main shaft while loading said collet chuck; and
    detecting an amount of radial deformation of said cylindrical elastic member by means of a non-contact displacement sensor disposed in face-to-face relationship with said elastic member.

* * * * *